Feb. 28, 1950
W. J. MEAD
2,499,324
METHOD OF MAKING IMPRESSIONS OF OBJECTS
Filed March 13, 1946
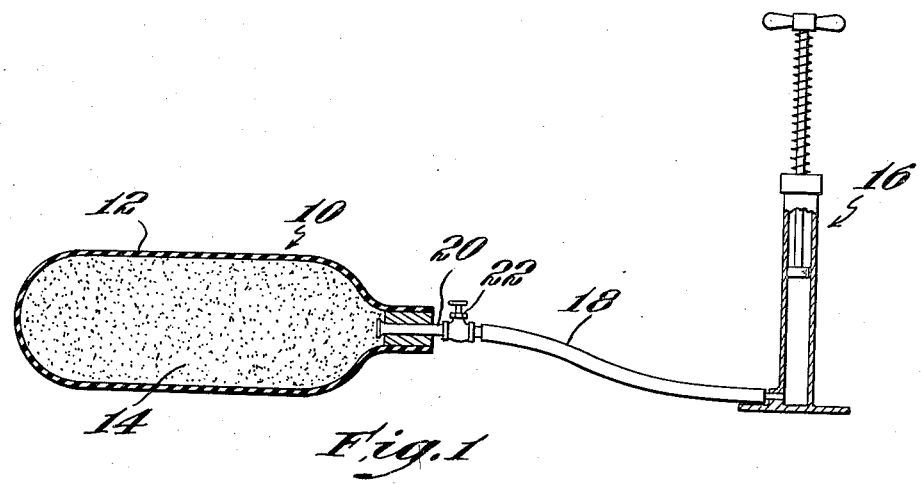
Fig. 1
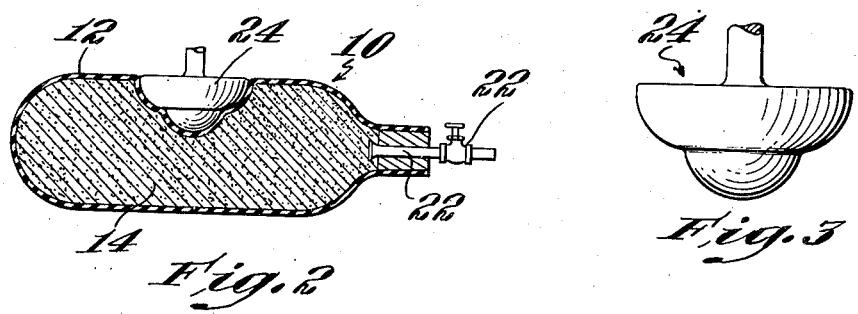
Fig. 2
Fig. 3
Inventor
Warren J. Mead
By Roberts, Cushman & Grover
Att'ys.

Patented Feb. 28, 1950

2,499,324

UNITED STATES PATENT OFFICE 2,499,324

METHOD OF MAKING IMPRESSIONS OF OBJECTS

Warren J. Mead, Belmont, Mass.

Application March 13, 1946, Serial No. 654,213

2 Claims. (Cl. 18—55)

In my application for patent, Serial No. 555,010, filed September 20, 1944, now Patent No. 2,488,922 issued November 22, 1949, I disclosed a method and apparatus for obtaining and maintaining an impression or shape imparted to a deformable device comprising a flexible and extensible wall of an impervious container filled with a deformable mass of mixed granular material and fluid, and then solidifying the granular mass in the shape imparted to it by reducing the pressure of the fluid within the container below that of the fluid medium surrounding the container.

For an explanation of the principles of dilatancy underlying both the invention of said application and the present invention, reference is hereby made to said application. The present invention is a modification or additional development of the method described in said application.

A sack or other container having a wall of flexible, elastic, impervious, sheet material, such as sheet rubber, enclosing a mass of granular material, for example sand, mixed with fluid, for example air or water, constitutes one form of deformable device for use in practicing the invention both of my said former application and of the present application.

When the sack is filled with a mixture of granular material and fluid at atmospheric pressure, as it usually and normally must be, and the mixture consists of proper proportions of granular material and fluid to be freely mobile or flowable so as to be readily deformed to the desired shape under conditions of equal pressure within and surrounding the sack, the desired form or impression may be made and will be retained so long as the sack is externally supported, but the form or impression will not persist, or will persist only partially or imperfectly, if the support holding the sack in the desired shape is withdrawn while the granular mass is still freely flowable.

For certain purposes it is desirable that the deformable device have the consistency of a plastic material such that, although capable of being molded or shaped into desired forms, it is sufficiently firm and self-sustaining to retain whatever shape or impression is imparted to it without distortion or change of shape due to the free flowing of the granular material and without external support.

I have discovered that a deformable device having the plastic characteristics just described may be produced by establishing within the closed sack or container a partial vacuum or negative fluid pressure somewhat below the pressure of the fluid medium surrounding the sack (for example the atmosphere), such internal vacuum or negative pressure being only of such degree that the granular mass does not become solidified into a rigid body but that the free flowability of the granular mass is eliminated and the mass acquires a plastic consistency capable of being molded or shaped into the desired forms and also possesses such self-sustaining firmness that it will retain its molded shape without flowing and without external support.

The degree of vacuum or negative pressure for producing this condition may be small, for example three or four inches of mercury. Moreover, the plasticity of the device may be varied and adjusted within limits to meet the needs of the work in hand by varying the degree of vacuum within the container, thereby varying the stiffness of the deformable device to the extent desirable for the intended purpose. A vacuum or negative pressure ranging from about two inches of mercury to about eight inches of mercury, will produce a condition of plasticity within the definition hereinbefore explained and provide a deformable device capable of being molded or shaped like a plastic and also having a consistency capable of supporting itself in its molded shape. The higher the vacuum within this range, the stiffer is the consistency of the plastic granular mass. A degree of vacuum substantially above or below this range tends either to solidify the mass or to leave it in a too freely flowable condition to be self-sustaining.

The various features of the invention will now be set forth in the following description with reference to the accompanying drawings showing one form of device and its method of use wherein:

Figure 1 shows a longitudinal vertical section through a deformable container filled with a deformable mass of mixed granular material and fluid and a simple type of exhaust pump for evacuating fluid therefrom;

Figure 2 shows a similar section with an object of irregular shape pressing into a wall thereof, and Figure 3 shows an object, a negative impression of which may be taken by pressing it into the wall of the device shown in Figure 2.

To make the plastic deformable device I provide a sack or container 10 Figure 1 having a wall 12 of flexible, elastic, impervious, sheet material filled with a deformable mass of mixed granular material and fluid, and then partially withdraw fluid 14 from within the sack to reduce the pressure of the fluid below that of the fluid medium surrounding the sack to an extent sufficient to render the device plastic within the definition hereinbefore explained. Fluid may be withdrawn by any ordinary form of exhaust pump 16, connected thereto by way of a flexible hose 18 and a nipple 20 extending from one end of the container. A valve 22 is interposed in the nipple so that when the proper degree of vacuum is reached, it may be maintained by closing the valve, whereupon the pump may for convenience in manipulation of the device be disconnected. The partial vacuum thus drawn may be varied to produce that degree of stiffness or softness of plasticity desired. Or, instead of reducing fluid pressure in the sack only sufficiently to induce plasticity, the fluid may be withdrawn up to the point of solidifying the device, and the device may then be rendered plastic to the desired degree by admitting fluid through the valve 22 in controlled quantities into the sack from the exterior. The essential condition is that a partial vacuum or negative pressure be established within the sack, whether by reducing or increasing the pressure, such that the device becomes plastic within the aforesaid definition.

In use the plastic deformable device may be molded or shaped into the desired form, which form it will retain without external support, and then the device may be solidified in its thus molded form by withdrawing additional fluid from within the sack in the manner set forth in my said former application.

The invention is useful in many situations where it is desired to mold or shape the deformable device to the contour of an object and to have the device, or an assembly of similar devices, self-sustaining in molded or deformed shapes without external support, either for use in that condition or with a view later to solidifying the device or devices if they are to be used in a rigid condition. A specific example is illustrated in the drawings in which an irregular object 24, Figure 3, is embedded in the flexible object wall 12 of the sack 10, Figure 2, whereby the sack receives a negative impression of the object and may then be employed either in its plastic state or in a solidified state to reproduce the object. While not illustrated herein, in surgical operations or in orthopedic therapy it is sometimes desired firmly to support the patient's body or some member of the patient's body in a certain position while the operation proceeds, or to obtain an accurate impression or mold of a member of the body. For such purposes one or more of said plastic deformable devices in the form of sacks filled with granular material and fluid may be packed and molded under and about and be conformed to the shape of the body or a member of the body and then solidified in such conformed shape.

Thus the plastic device or a built-up assemblage of similar plastic devices may be molded and manipulated to fit the contour of the object, and being self-sustaining will retain the shapes and contours imparted to them, both in the course of molding or manipulation and after its completion. Thereafter if it is desired to use the devices in rigid form, they may be solidified by exhausting additional fluid from within the sacks.

Although only two typical examples of the utility of the invention have been given, it is applicable to an indefinite variety of uses where it is desirable to obtain in the deformable device a molded shape or impression which will have a sufficiently self-sustaining plastic consistency to preserve the shape without external support.

It should be understood that the present disclosure is for the purpose of illustration only and that this invention includes all modifications and equivalents which fall within the scope of the appended claims.

I claim:

1. The method of obtaining an impression of the shape of an object by means of a device of the kind comprising an impervious container having a flexible and extensible wall enclosing a deformable and flowable mass of mixed granular material and fluid, which method comprises establishing the pressure of the fluid within the container below that of the fluid medium surrounding the container sufficiently to convert the flowable mass into a plastic mass, molding the plastic device to the desired shape, and thereafter solidifying the granular mass in its molded shape by still further reducing the fluid pressure within the container.

2. The method of obtaining an impression of the shape of an object by means of a device of the kind comprising an impervious container having a flexible and extensible wall enclosing a deformable and flowable mass of mixed granular substantially inert, non-coherent material and a non-reactive, non-coherent fluid, which method comprises establishing the pressure of the fluid within the container below that of the fluid medium surrounding the container sufficiently to convert the flowable mass into a plastic mass, molding by pressing the plastic device into engagement with the object to take an impression which is the converse of the object, removing the shaped plastic device from the object, and thereafter solidifying the granular mass in its molded shape by still further reducing the fluid pressure within the container.

WARREN J. MEAD.

REFERENCES CITED

The following references are of record in the file of this patent:

UNITED STATES PATENTS

| Number | Name | Date |
| --- | --- | --- |
| 2,092,909 | Daniels | Sept. 14, 1937 |
| 2,092,910 | Daniels | Sept. 14, 1937 |
| 2,129,240 | Sanborn | Sept. 6, 1938 |